March 11, 1969  J. J. COWLEY  3,432,060
TUBULAR PRESSURE VESSEL
Filed April 23, 1965

INVENTOR:
JOHN JAMES COWLEY
BY:
Cavanagh & Norman

United States Patent Office 3,432,060
Patented Mar. 11, 1969

3,432,060
TUBULAR PRESSURE VESSEL
John James Cowley, Toronto, Ontario, Canada, assignor, by mesne assignments, to Therapeutic Research Corporation Limited
Filed Apr. 23, 1965, Ser. No. 450,325
U.S. Cl. 220—3                          1 Claim
Int. Cl. F25j 5/00; B65d 7/42, 81/18

ABSTRACT OF THE DISCLOSURE

This specification discloses tubular pressure vessel incorporating a length of thin wall tubing wound upon itself and provided with capillary tube outlet means for containing gases under very high pressures.

---

The invention relates to a pressure vessel for containing gases under very high pressures.

Conventional pressure vessels are normally of cylindrical shape having domed ends, and some such pressure vessels have been made which are entirely spherical in space required for such vessels, and in addition, the econ-maximum of contained volume in relation to the storage space required for such vessels, and in addition, the economy in utilization of metal or other fabric in the construction of such vessels of these conventional shapes, particularly when considered in relation to the development of localized weaknesses due to unequal stresses therein, is generally considered to be significant. However, in practice, while such vessels are usually rated to accommodate up to 2,500 p.s.i. they are not usually filled to a pressure greater than 1,500 p.s.i. due to the stringent safety requirements imposed by various public authorities. In fact, it is well known that such pressure vessels are designed for a bursting pressure of between 10,000 and 12,000 p.s.i. and are calculated according to well known engineering principles as having a flexing pressure of 50 percent of the burst pressure or in the region of 5,000 to 6,000 p.s.i. Safety requirements restrict the filling of such vessels in excess of one-half of the flexing pressure with the result that 2,500 p.s.i. is usually considered to be the absolute upper limit for a new pressure vessel and such vessels are usually progressively derated to lower pressures over a relatively short useful life. A further problem in relation to such pressure vessels is that safety requirements lay down that they must be tested under full pressure prior to filling. The testing gas is usually compressed air and, where the gas to be filled in the container is other than air, such air must be first of all scavenged from the container before it is filled with gas. This pretesting operation adds substantially to the cost of filling such vessels and significantly restricts their application to mass production techniques.

The design of such conventional pressure vessels has generally speaking restricted the use of pressures significantly in excess of 2,000 or 2,500 p.s.i. in many cases where it would otherwise be desirable to go to very much higher pressures up to even 10,000, 20,000 or even 30,000 p.s.i. The principle difficulty involved is that to accommodate such increased pressures a very much greater weight of metal or other material would be required and, as the wall thickness of the vessels is increased the problem of equalizing the stresses through the thickness of the wall from the inside to the outside becomes very much greater. It is well known that the stresses on the inside of the wall will in any event be greater than on the outside of the wall of the vessel and in the case of some high pressure vessels attempts have been made to overcome this, as for example, in the design of gun barrels for very large long range guns by forming an interior sleeve which is thereafter wound with metallic cords under substantial stress thereby prestressing the exterior portion of the resultant composite wall to a greater degree than the interior of the wall. However, such a procedure is extremely costly and is unsuitable for mass production of pressure vessels. Accordingly, it is desirable, where possible, to provide a pressure vessel for use with high pressures having a very much thinner wall thickness in which the problem of equalization of stresses will be greatly reduced.

A still further disadvantage of the conventional type of pressure vessel is that, while its cylindrical shape is generally speaking suitable for storage or warehousing it is unsuitable for many particular applications which require a pressure vessel of a particular shape to fit around the body for example, or to fit within a confined space or around other equipment, such as an aircraft of a space vehicle.

A further problem in conventional pressure vessels is that a rupture will result in an escape of compressed gas in a manner similar to an explosion which is highly destructive and dangerous to life due to flying fragments of metal.

Accordingly, it is an objective of the present invention to provide a pressure vessel adapted for use with very high pressures and having a relatively thin wall construction for equalizing pressure stresses therein.

More particularly, it is an objective of the present invention to provide a pressure vessel having the foregoing advantages wherein the consequences of a breakdown of the wall of the vessel are very considerably less than in the case of conventional pressure vessels.

More particularly, it is an objective of the present invention to provide a pressure vessel having the foregoing advantages which may be formed into a variety of different shapes without impairing either the contained volume thereof or the pressures adapted to be contained thereby.

The foregoing and other advantages will be apparent from the following description of a preferred embodiment of the invention which is here made by way of example only and with reference to the following drawings in which like reference devices refer to like parts thereof throughout the various views and diagrams, and in which.

Figure 1:
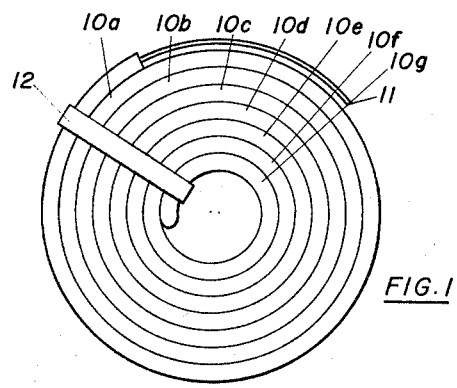
FIGURE 1 is a plan view of a pressure vessel according to the invention.

From the illustration it will be seen that the invention centres around a pressure vessel of essentially thin-walled tubular construction, as distinct from the conventional pressure vessel of relative thick walled cylindrical construction having domed ends.

Theoretically, a given mass of metal such as steel, if the distribution of fibre stress in a thick wall is neglected, should hold the same volume of compressed gas if made in the form of a relatively short large diameter cylinder, or if distributed in the form of a long small diameter tube of thinner wall thickness.

However, when the factor of fibre stress distribtuion in the wall of the vessel is considered, it will be apparent that the stress distribution in the thick walled cylindrical vessel is considerably less efficient than the stress distribution in the thin walled tube. Thus, the design considerations from the viewpoint of pressure alone appear to favour a relatively long thin walled tube for containing a very high pressures.

However, a further factor which must be taken into account is the construction of the tube itself. It is well known that the circumferential stress in a cylindrical body containing compressed gas is double the longitudinal stress, which would appear to limt the use of many types of tubing. However, if the tubing is made in such a way that the crystal structure of the metal is oriented in favour of increasing the circumferential stress, possibly at the expense of reducing the longitudinal stress, this difficulty to, can be overcome. It has been found according to the invention that where the tubing is constructed from welded laminations or tape wound in a spiral, the crystal structure is oriented along the axis of the laminations or tape so that the principle stress resistance of the metal is almost, but not quite, matched to the circumferential stress direction, that very substantial increases in bursting pressures can be obtained, and the loss in longitudinal stress is not significant since, as stated, the longitudinal stress is only one-half that of the circumferential stress. Such laminated or tape wound tube has very considerable advantages over the normal drawn tube in which the crystal structure of the metal is oriented in a lengthwise direction axially of the tube by reason of the drawing operation itself, and thereby increasing the stress resistance in the longitudinal direction at the expense of the circumferential direction. In addition, the laminated or tape wound tubing is considerably more economical to form than the drawn tubing.

While the small diameter tubing encloses a proportionately smaller volume than does the larger diameter cylindrical vessel, it can be charged to more than propotrionately higher pressure and, in many cases, provides significant advantages such as, higher operating pressures, reduced storage volume, and reduced buoyancy for use in underwater diving for example.

In addition, the small diameter tubing can be wound upon itself and formed into any convenient shape of coil at low cost for improved space utilization.

Figures 2, 5:
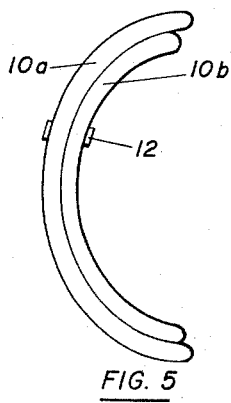
FIGURE 2 is an end elevation of the pressure vessel of FIGURE 1.
FIGURE 5 is an end elevation of a pressure vessel according to a further embodiment.
Figure 3:
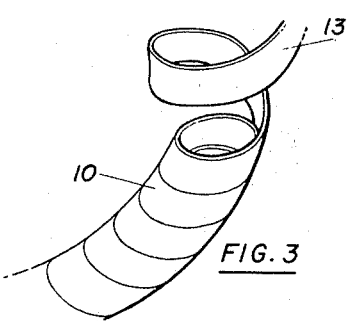
FIGURE 3 is a greatly enlarged perspective illustration of a portion of the pressure vessel shown in FIGURES 1 and 2 opened up to reveal its construction.

Referring now to FIGURE 1 and FIGURE 2 it will be noted that the pressure vessel according to this embodiment of the invention comprises a continuous small diameter tube 10 wound upon itself in a spiral to form a series or bank of tubes 10a, 10b, 10c, 10d and 10e, somewhat in the general form of a catherine wheel, all of the banks of tubes 10a, 10b, 10c, 10d and 10e being shaped around into a generally arcuate formation as shown in FIGURE 2 to provide a single pressure vessel adapted to fit around the waist of a diver for example, without interfering with his movements. A connection is made to the tube 10 by means of a relatively thin capillary tube 11 extending from one end of tube 10 and connected to any suitable metering system (not shown) dependent upon the particular situation and the operating pressures required. Any suitable retaining means such as metallic strip 12 are provided around banks 10a, 10b, 10c, 10d and 10e, to maintain the same in their coiled location. From FIGURE 3 it will be noted that the tube 10 according to this preferred embodiment is of so called tape-wound construction comprising a continuous metallic and/or strip 13 wound continuously around upon itself in edge overlapping relation to form a continuous tube, the edges of strip 13 being welded or otherwise fastened and sealed. Such metal strip 13 is preferably formed by extruding and rolling according to known techniques in a manner such as to orient the crystal structure of the metal lengthwise along the strip giving the metal its greatest stress resistance along its longitudinal axis. When formed into a tube as shown in FIGURE 3, it will be noted that the longitudinal axis of the strip then becomes oriented substantially around the circumference of tube 10, but being slightly off-set with relation thereto due to the spiral winding of strip 13.

Figure 4:
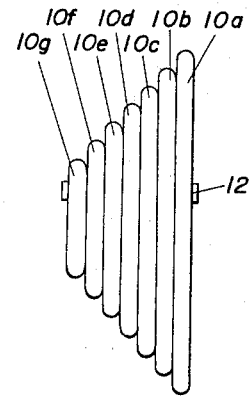
FIGURE 4 is an end elevation of a further embodiment of the pressure vessel according to the invention.

FIGURE 4 shows a tubular pressure vessel 10 wound into a generally frusto conical shape such as might be used for fitting within the curved interior of an aircraft or space vehicle, and in adidtion, may be used to provide a protective housing for control valve and other equipment.

While a pressure vessel as shown in FIGURES 1 to 4 with a single wall thickness of strip 13 may be employed for working pressures as high as 10,000 p.s.i., where it is desired to go higher and still overcome the dangers involved in such high pressures the pressure vessel according to the invention may be provided with two or more separate walls one around the other pressurized to different levels.

Figure 6:
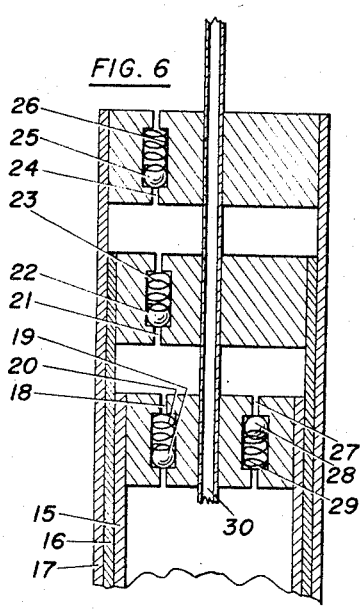
FIGURE 6 is a sectional side view of an end portion of a pressure vessel according to a further embodiment.

One form of such a multiwall pressure vessel as shown in FIGURE 6 and comprises an inner tube 15 for containing the highest pressures, intermediate tube 16 pressurized to a level somewhat below that of tube 15 and an outer tube 17 pressurized to a still lower level. The inner tube or vessel 15 is provided with a one way gas outlet valve comprising conduit 18 ball valve 19 and spring 20 adapted to permit the escape of gas from vessel 15 when the pressure differential between vessels 15 and 16 rises above a predetermined level set by spring 20. Vessel 16 is similarly provided with a one-way gas outlet valve comprising conduit 21 ball valve 22 and spring 23 establishing a predetermined pressure differential between vessels 15 and 16. Vessel 17 is provided with a one-way gas outlet valve operating as a safety valve comprising a conduit 24 ball valve 25 and spring 26, although it will be appreciated that vessel 17 could in turn be enclosed with a further vessel and this could be repeated as many times as may be required. In addition, gas contained within vessel 16 may be communicated to the interior of vessel 15, as a result of use, a negative pressure differential exists therebetween thereby permitting the use of gas within vessel 16, such valve comprising conduit 27 ball valve 28 and spring 29. A gas outlet tube is provided communicating from the interior of vessel 15 to the exterior of the system in the form of capillary tube 30.

While the multiwall pressure vessel of FIGURE 6 is particularly suited for use in association with this walled tubular pressure vessels according to this invention, it will be understood that a multiwalled system of this type can also be applied to other types of pressure vessels such as for example, fibre glass wound spheres, with the same end result namely, the equalization of fibre stress throughout the wall thickness of any pressurized vessel by the use of a series of thin walled pressurized vessels each pressurized to progressively lower or higher pressures.

I claim:
1. A tubular pressure vessel for high pressure gases and comprising:
   a first length of tubing formed of a helically-wound length of strip material bonded together at its edges to form a continuous tube;
   means closing each end of said length of tubing;
   a second length of tubing formed as aforesaid of a greater diameter than said first length and fitting therearound and extending beyond an end of said first length of tubing;

means closing an end of said second length of tubing around said first length of tubing;

one way valve means communicating between the interior of said first length of tubing and the interior of said second length of tubing, permitting gas to flow from said first to said second length of tubing;

one way valve means communicating between the interior of said second length of tubing and the interior of said first length of tubing, permitting gas to flow from said second to said first length of tubing;

one way valve means communicating between the interior of said second length of tubing and the exterior thereof;

a third length of tubing formed as aforesaid of a greater diameter than said second length and fitting therearound and extending beyond an end thereof;

means closing an end of said third length of tubing around said second length;

and one way valve means communicating between the interior of said third length of tubing and the exterior thereof, and conduit means extending through said third length of tubing as well as said second length of tubing and said first length of tubing for access to the interior of said first length of tubing as a foresaid.

References Cited

UNITED STATES PATENTS

| | | | |
|---|---|---|---|
| 1,793,280 | 2/1931 | Williams | 138—154 |
| 1,827,381 | 10/1931 | Bundy | 138—150 |
| 2,008,528 | 7/1935 | Warren | 165—156 |
| 2,253,093 | 8/1941 | Raichle et al. | 220—3 |
| 2,366,141 | 12/1944 | Alderfer | 220—3 |
| 2,621,903 | 12/1952 | Cohler | 220—83 |
| 2,844,271 | 7/1958 | Shelton | 220—3 |

FOREIGN PATENTS

| | | |
|---|---|---|
| 472,059 | 2/1929 | Germany. |
| 606,935 | 1948 | Great Britain. |

RAPHAEL H. SCHWARTZ, *Primary Examiner.*